(12) United States Patent
Lovegrove

(10) Patent No.: US 11,754,990 B2
(45) Date of Patent: Sep. 12, 2023

(54) EDGE COMPUTING DEVICE WITH ARTIFICIAL INTELLIGENCE MODEL FOR EMULATING CONTROL LOGIC OF A PROGRAMMABLE LOGIC CONTROLLER

(71) Applicant: MORPHIX, INC., Vancouver, WA (US)

(72) Inventor: Jonathan Lovegrove, Yacolt, WA (US)

(73) Assignee: MORPHIX, INC., Vancouver, WA (US)

(*) Notice: Subject to any disclaimer, the term of this patent is extended or adjusted under 35 U.S.C. 154(b) by 314 days.

(21) Appl. No.: 17/084,414

(22) Filed: Oct. 29, 2020

(65) Prior Publication Data
US 2022/0137583 A1 May 5, 2022

(51) Int. Cl.
*G05B 19/05* (2006.01)
*G06N 3/08* (2023.01)

(52) U.S. Cl.
CPC ............... *G05B 19/05* (2013.01); *G06N 3/08* (2013.01); *G05B 2219/13111* (2013.01)

(58) Field of Classification Search
CPC .................................. G05B 19/05; G06N 3/08
USPC ......................................................... 700/48
See application file for complete search history.

(56) References Cited

U.S. PATENT DOCUMENTS

| | | | |
|---|---|---|---|
| 2019/0324441 A1 | 10/2019 | Cella et al. | |
| 2020/0310394 A1 | 10/2020 | Wouhaybi et al. | |
| 2021/0096827 A1* | 4/2021 | Stump | G06K 9/6256 |
| 2021/0103654 A1* | 4/2021 | Putman | G05B 23/0275 |
| 2021/0312393 A1* | 10/2021 | Stump | G06Q 10/101 |
| 2021/0397171 A1* | 12/2021 | Sayyarrodsari | G06Q 10/06393 |
| 2022/0027529 A1* | 1/2022 | Zarur | G05B 19/4189 |

OTHER PUBLICATIONS

US Patent and Trademark Office, International Search Report and Written Opinion Issued in Application No. PCT/US2021/072050, dated Jan. 28, 2022, WIPO, 17 pages.

\* cited by examiner

*Primary Examiner* — Md Azad
(74) *Attorney, Agent, or Firm* — Alleman Hall Creasman & Tuttle LLP

(57) ABSTRACT

An edge computing device is provided that includes a plurality of input electrodes that are communicatively coupled to one or more communication channels of a programmable logic controller that implements control logic to control a controlled device. The edge computing device furthers include a processor configured to, at a training time, receive signals via the plurality of input electrodes, detect inputs to the one or more communication channels and outputs from the one or more communication channels of the programmable logic controller, generate a set of training data based on the detected inputs and outputs of the programmable logic controller, and train an artificial intelligence model using the generated set of training data. The processor is further configured to, at a run-time, emulate the control logic of the programmable logic controller using the trained artificial intelligence model.

20 Claims, 13 Drawing Sheets

EDGE COMPUTING DEVICE WITH ARTIFICIAL INTELLIGENCE MODEL FOR EMULATING CONTROL LOGIC OF A PROGRAMMABLE LOGIC CONTROLLER

BACKGROUND

Industrial systems use programmable logic controllers (PLC) to manage and control industrial devices and systems. Typically, PLC devices are used in scenarios that require flexible, rugged, and high reliability automation. PLCs are built to be resilient to harsh environment conditions that occur in industrial scenarios. General-purpose computer devices typically cannot replace these PLCs due to the computer components of the general-purpose computer devices degrading when placed in an industrial environment.

SUMMARY

According to one aspect of the present disclosure, an edge computing device is provided. The edge computing device may include a plurality of input electrodes that are communicatively coupled to one or more communication channels of a programmable logic controller that implements control logic to control a controlled device. The edge computing device may further include a processor configured to, at a training time, receive signals via the plurality of input electrodes, detect inputs to the one or more communication channels and outputs from the one or more communication channels of the programmable logic controller, generate a set of training data based on the detected inputs and outputs of the programmable logic controller, and train an artificial intelligence model using the generated set of training data. The processor may be further configured to, at a run-time, emulate the control logic of the programmable logic controller using the trained artificial intelligence model by receiving an input from the controlled device, determining an output based on the input using the emulated control logic, and sending the output to the controlled device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Industrial systems often use programmable logic controllers (PLC) to manage and control the industrial devices and systems. As a few examples, oil and gas facilities may utilize PLC devices to control industrial refrigeration and other equipment, industrial manufacturers may use PLC devices to control robotic devices, conveyors, and other components in an assembly line, and water treatment plants may use PLC devices to control valves and other piping infrastructure based on data received from pressure sensors, flow sensors, etc. Myriad other applications exist in semiconductor processing, electricity generation and distribution, heating air conditioning and ventilation (HVAC), and other technical fields. Often, PLC devices are used in environments that demand flexible, rugged, and high reliability automation.

With such extensive deployment in such varied environments, one challenge associated with PLC devices is their maintenance and replacement. As with any electrical component, PLC devices have a typical useful lifetime under normal operating conditions, and will eventually require repair or replacement as components degrade. Harsh environments and heavy use can hasten failure and thus shorten the useful lifetime of a PLC device. Further, in some cases an operator may desire to replace a PLC before the end of its useful life to take advantage of technological advancements of newer controllers potentially offering higher reliability, lower power consumption, additional features, or other advantages. However, many entities that use these PLC device-based systems may no longer employ the technicians that originally assembled the system and may not possess sufficient technical documentation of such systems, and thus may have lost the institutional expertise to reprogram or repair an aging PLC device deployed in particular manner. To address these issues, FIG. 1 illustrates an example computer system 10 that includes an edge computing device 12 that trains an artificial intelligence model to emulate the control logic of a PLC, as will be discussed in more detail below.

Figure 1:
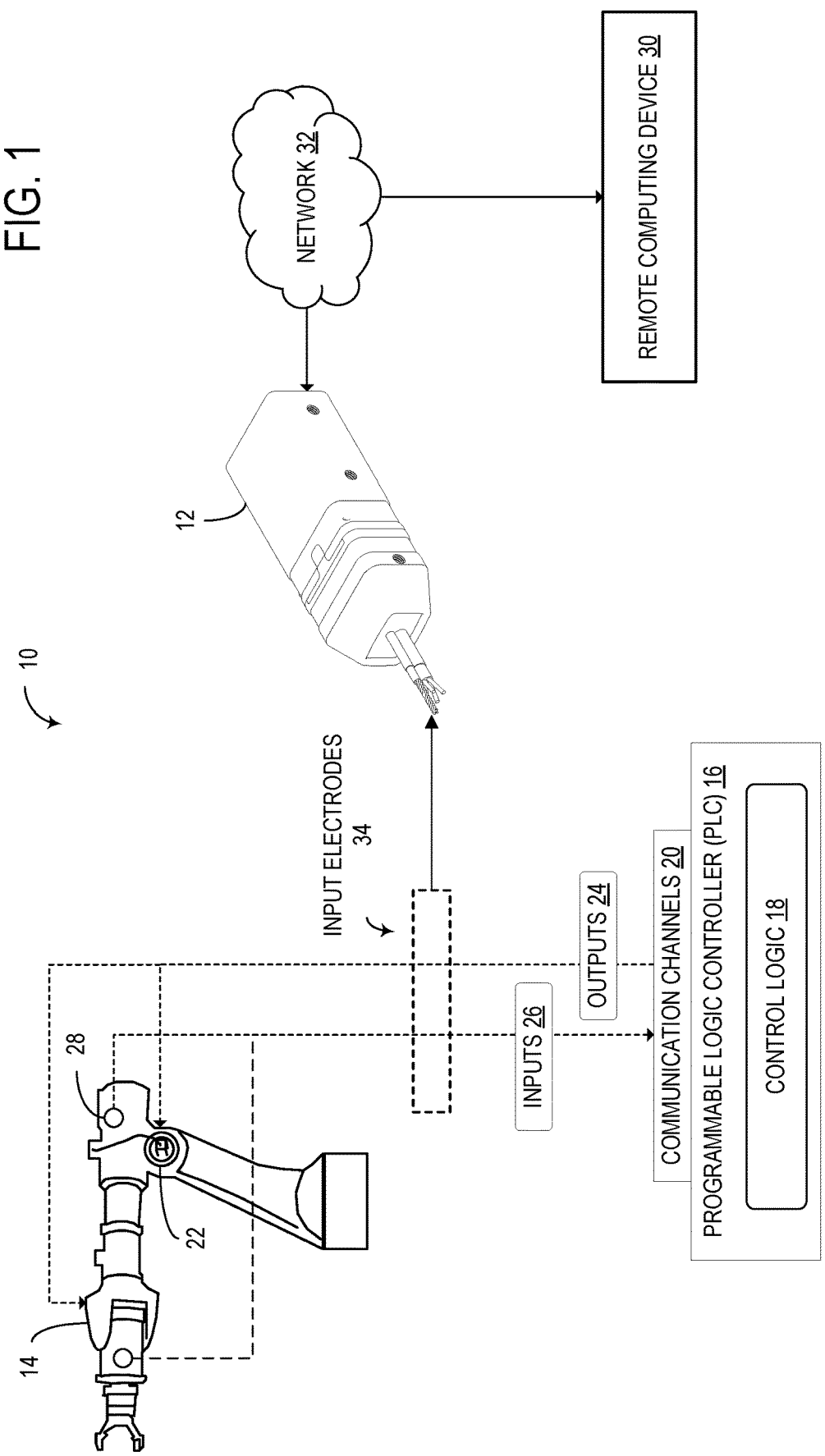
FIG. 1 is a general schematic diagram illustrating a computing system that includes a programmable logic controller, a controller device controlled by the programmable logic controller, and an edge computing device that trains an artificial intelligence model to emulate the control logic of the programmable logic controller, according to an embodiment of the subject disclosure.

The example computer system 10 of FIG. 1 includes a controlled device 14 that is managed by a PLC 16. The PLC 16 includes a logic circuit that implements control logic 18 for managing one or more controlled devices 14 that are communicatively coupled to the PLC 16. In one example, the control logic 18 may be implemented using ladder logic or another type of rule-based programming language. However, it should be appreciated that other types of programming languages may be used to implement the control logic 18, such as, for example, the general purpose programming languages Python, C#, C++, C, and FORTRAN. The PLC 16 communicates with the controlled device 14 via a plurality of communication channels 20. The communication channels 20 may include communication structures such as connector pins and ports of the PLC 16, wired or wireless connections between PLC 16 and the controlled device 14, and other channels via which communications are exchanged between the PLC 16 and the controlled device 14.

In the example illustrated in FIG. 1, the controlled device 14 is an electromechanical system that may, for example, take the form of a robotic arm of a vehicle assembly line. However, it will be understood that the controlled device 14 may take any other suitable form, such as, for example, controlled devices in an HVAC system, alarm system, plumbing system, conveyor system, manufacturing applicator, industrial refrigeration system, or other controlled system. These examples are not to be considered limiting as numerous other examples are possible.

The PLC 16 may be configured to execute control logic 18 to control one or more controllable components 22 of the controlled device 14 using outputs 24 sent via the communication channels 20. In the specific example of FIG. 1, the controllable components 22 take the form of actuators for causing movement of the robotic arm. The actuators may be one or more components of the controlled device 14 that are configured to move when they receive electrical signals. For example, the one or more actuators may be powered by electrical, hydraulic, mechanical, thermal, or magnetic force, and may take the form of linear actuators, rotary actuators, motors, electrically controllable switches, electrical drivers for loudspeakers, etc. It should be appreciated that the one or more controllable components 22 may take other suitable forms depending on the type of controllable device 14. For example, the one or more controllable components 22 may take the form of heating and refrigeration coils, fans, compressors, valves, lights, cameras, loudspeakers, conveyors, grippers, applicators, and other types of controllable components 22 that may receive an output from the PLC 16 to perform a function of the controlled device 14. The outputs 24 used to control the controllable elements 22 may take a form suitable for the type of controllable element. As one example, the output 24 may be a program instruction. In another example, the output 24 may be a supplied voltage/current. However, it should be appreciated that other the output 24 may take other suitable forms not specifically described herein.

The PLC 16 may be further configured to receive inputs 26 from the controlled device 14 via the communication channels 20. In the example illustrated in FIG. 1, the inputs 26 include sensor data from one or more sensors 28 of the controlled device 14. The sensors 28 may be configured to detect one or more parameters of the controlled device 14, such as, for example, a current position and orientation of the robotic arm. As another example, the sensors 28 may be configured to detect one or more parameters of a physical environment near the controlled device 14. The one or more sensors 26 may be integrated into the controlled device 14, or may be situated in the physical environment. The one or more sensors 28 may, for example, include one or more cameras, one or more temperature sensors, one or more accelerometers, one or more gyroscopes, one or more pressure sensors, one or more microphones, one or more magnetic field sensors, one or more flowrate sensors, one or more light sensors, one or more electrical sensors configured to sense voltage, current, or magnetic field, or one or more other types of sensors. It should be appreciated that the sensors 28 are not limited to the specific example sensors described herein.

The PLC 16 may be configured to receive inputs 26 via the communication channels 20 and process those inputs 26 using the control logic 18. The PLC 16 may subsequently generate outputs 24, which are sent via the communication channels 20 to control the controlled device 14. In this manner, one or more controlled devices 14 may be controlled by the PLC 16. However, as discussed above, the control logic 18 may be implemented in a programming language that the business running the PLC 16 no longer has the technical expertise to support. In order to emulate the functions of the control logic 18 of the PLC 16 such that the controlled device 14 may continue to be appropriately managed, the edge computing device 12 of FIG. 1 may be used to learn, through application of an artificial intelligence model, the control parameters of the PLC, as will be described in more detail below.

The edge computing device 12 may be located proximate to one or more controlled devices 14 and PLC 16 in the physical environment and may communicate with the one or more controlled devices 14 a wired or wireless local connection. The wired or wireless local connection is typically a serial connection (e.g., universal serial bus (USB), RS-232), fieldbus connection (e.g., GPIB, MAP, MMS, MODBUS, PROFIBUS, INTERBUS, CAN, etc.), local area network (LAN) connection (e.g., wired LAN over Ethernet/IP or wireless LAN), or other suitable local connection that does not include a high latency computer network such as a wide area network (WAN). The edge computing device 12 may be referred to as an edge computing device due to its position on the network topology having a local connection to the one or more controlled devices 14 and PLC 16 and a remote connection to a remote computing device 30.

The edge computing device 12 may be configured to have a remote connection with the remote computing device 30 over a computer network 32 such as, for example, a WAN. In one example, the remote computing device 30 may be a client device that a user may interact with the control or otherwise manage the edge computing device 12. In another example, the remote computing device 30 may include a plurality of computing devices, such as, for example, a client computer that communicates with a server system over a WAN.

As illustrated in FIG. 1, the edge computing device 12 further includes a plurality of input electrodes 34 that are communicatively coupled to one or more communication channels 20 of the programmable logic controller 16 that implements control logic 18 to control the controlled device 14. It should be appreciated that the input electrodes 34 may take a form suitable for the type of communication channel 20 implemented by the PLC 16, and are typically coupled by sufficiently high impedance connections to the inputs 26 and outputs 24 so as to not interference with the signals being exchanged between the PLC 16 and the controlled device 14. In this way, the input electrodes 34 are configured to detect the inputs 26 and outputs 24 transmitted via the communication channels 20 without impacting the transmission of those inputs 26 and outputs 24. In this manner, the edge computing device 12 may monitor the inputs 26 and outputs 24 while the PLC 16 is controlling the controlled device 14 according to the control logic 18.

Figure 2:
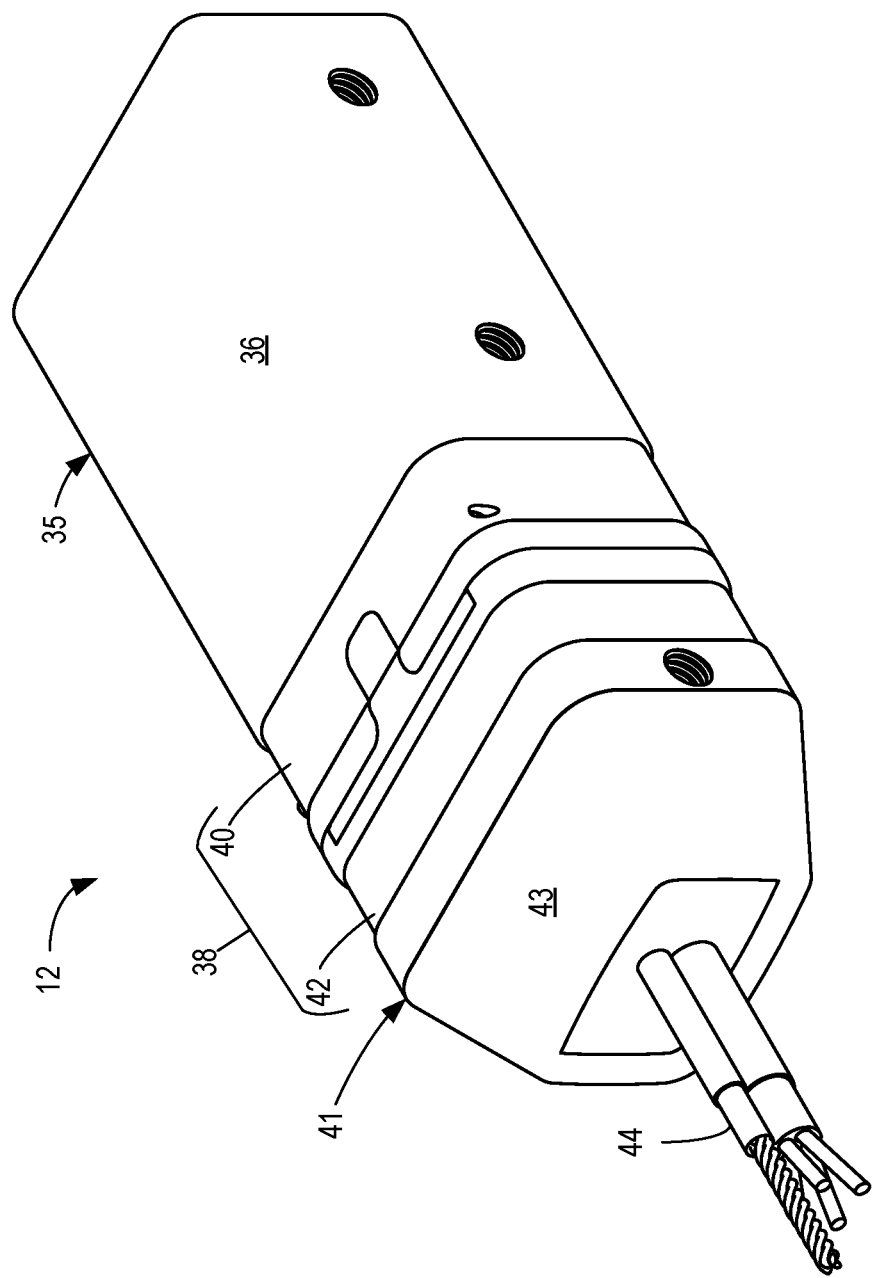
FIG. 2 is a diagram that illustrates an isometric view of the edge computing device of FIG. 1.

FIG. 2 illustrates an example of the edge computing device 12. In this example, the edge computing device may be separated into two components, namely a base unit 35 and a and a field connector 41, via a separable interface 38. FIG. 2 shows an assembled view of the interface 38. The interface 38 may include a first part 40 located on the base 35 side of the housing 36 of the edge computing device 12. The first part 40 of the interface 38 is configured to couple to a second part 42 on the field connector 41 side of the interface 38. In one example, during an input/output data collection phase, the input electrodes 34 may be coupled to the second part 42 of the interface 38 via a wiring system 44. During an emulation phase where the edge computing device 12 actively controls the controlled device 14, as will be discussed in more detail below, the controlled device 14 may be directly coupled to the edge computing device 12 via the wiring system 44. In some example, the types of wires required for the input electrodes 34 may be different than the types of wires required for directly coupling and exchanging inputs and outputs with the controlled device 14.

In these examples, the edge computing device 12 may include a plurality of second parts 42 of the interface 38 that each include different wiring systems 44 that are suitable for different functions. The plurality of second parts 42 of the interface 38 may be separately coupled to the first part 40 of the interface 38 as required. Thus, a variety of different field connectors 41 may be manufactured each of which can be interoperably connected to the base unit 35, and each having different wiring connected thereto that can connect to a specific set of inputs on one or more particular controlled device(s) for a specific deployment. In this way, manufacturing the base unit 35 and field connector 41 as separate components according to customer need promotes an economy of manufacture.

Computer components such as a processor, memory, and input/output module of the edge computing device 12 are securely enclosed within the housing 36. The housing 36 is ruggedized and protects the computer components from the conditions of the local environment and from impacts or other outside forces. The ruggedized housing 36 prevents degradation of the computer components of the edge computing device 12 during operation in environments that would cause typical computer devices to degrade. For example, an industrial environment such as a machine tool shop may have conductive particulates in the air that would potentially damage typical computer devices. However, the ruggedized housing 36 seals the computer components of the edge computing device 12, allowing the edge computing device 12 to operate in the industrial environments where PLCs are typically deployed in place of conventional computers.

Figure 3:
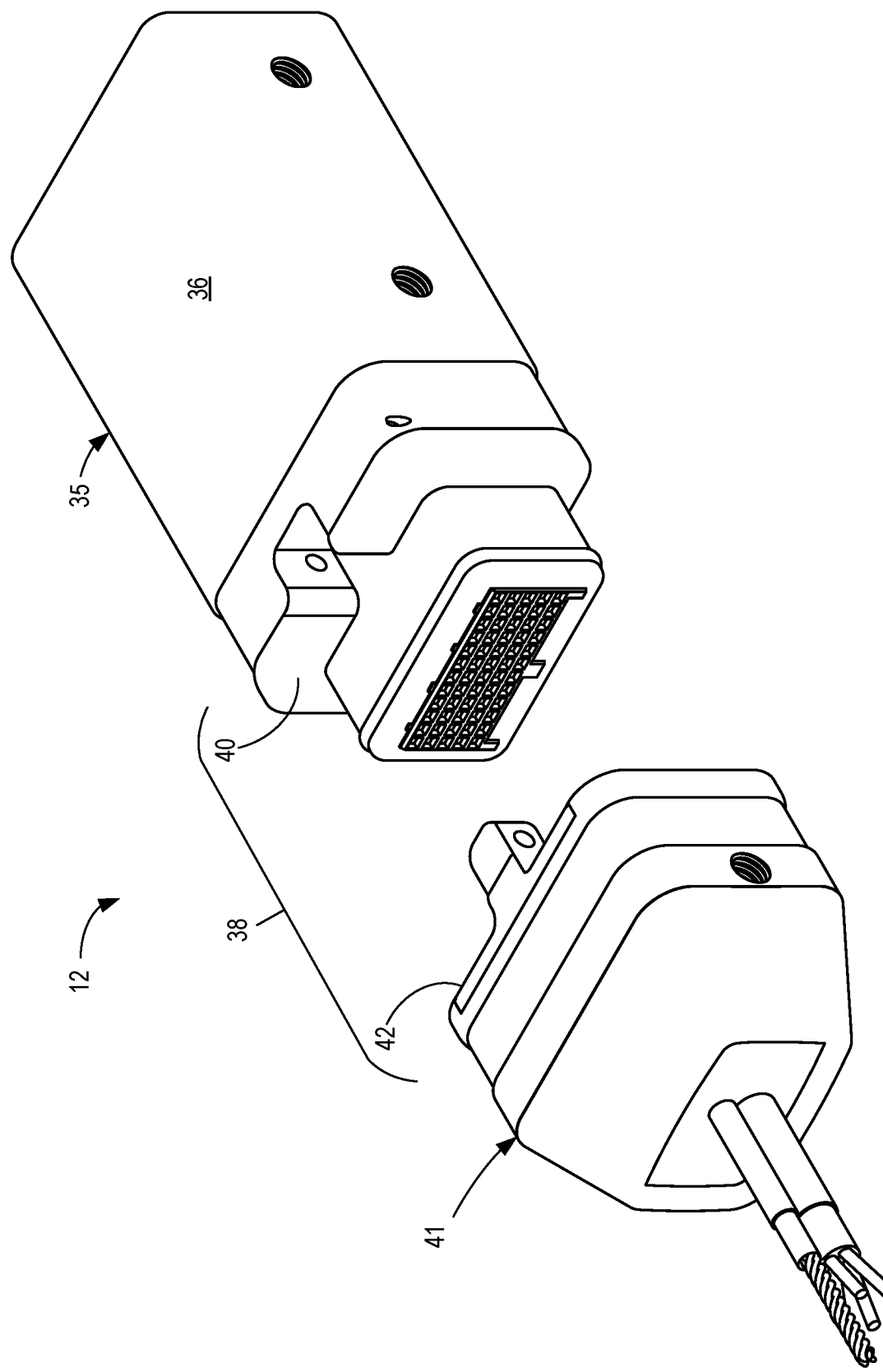
FIG. 3 is a diagram that illustrates an isometric view of a disconnected state of the edge computing device of FIG. 1.

FIG. 3 illustrates an example of an outside view of the edge computing device 12 in a configuration where the first part 40 and second part 42 of interface 38 are disconnected. In the illustrated example, the first part 40 of the interface 38 may include receiving connectors for pins positioned on the second part 42 of the interface 38. It should be appreciated that other examples, the pins may be positioned on the first part 40 of the interface 38. By connecting the first part 40 and second part 42 of the interface 38, the input electrodes 34 coupled to the second part 42 of the interface 38 may be communicatively coupled to the edge computing device 12. Further, as the first part 40 and second part 42 of the interface 38 may be disconnected, other types of second parts 42 of the interface 38 may be attached as required.

Figure 4:
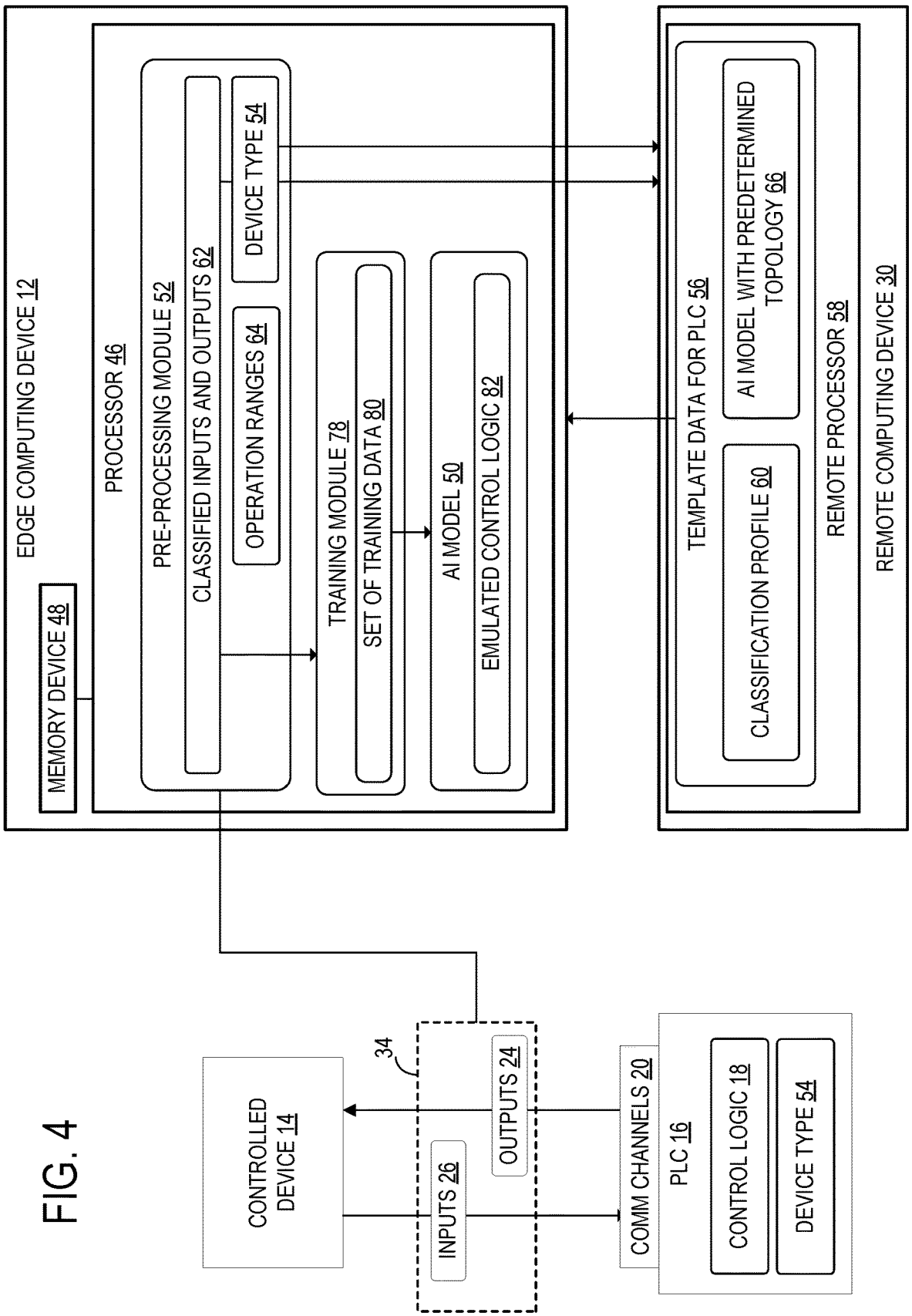
FIG. 4 is a detailed schematic diagram illustrating a training phase for an artificial intelligence model that is trained by the edge computing device of FIG. 1.

FIG. 4 illustrates a schematic view for training an artificial intelligence (AI) model to emulate the control logic 18 of the PLC 16. The edge computing device 12 includes a processor 46, a memory device 48, and other computer components that are secured within the housing 36 of the edge computing device 12. The memory device 48 may include volatile and non-volatile memory. FIG. 4 shows the edge computing device 12 operating at a training time where inputs 26 and outputs 24 are detected via the plurality of input electrodes 34. During the training time, the edge computing device 12 is configured to receive signals via the plurality of input electrodes 34. The edge computing device 12 may be configured to detect inputs 26 to the one or more communication channels 20 and outputs 24 from the one or more communication channels 20 of the programmable logic controller 16.

In one example, the edge computing device 12 may be deployed nearby a PLC 16 and controlled device 14 that are currently running as normal, under control of the PLC 16. The edge computing device 12 may passively detect the inputs 26 and outputs 24 being exchanged between the controlled device 14 and PLC 16 during normal operation.

The length of the training time may be set based on an expected time it will take for the PLC 16 and controlled device 14 to perform all expected actions of the control logic 18 during normal operation. However, in some systems, the controlled device 14 and PLC 16 may potentially not perform all expected actions of the control logic 18 in a suitable time frame of normal operation. For example, the control logic 18 may include logic for rare occurrences or corrective functions that may not be triggered in a suitable time frame for training the AI model of the edge computing device 12. In these examples, at least some of the training time for the edge computing device 12 may occur during simulated operation of the controlled device 14. For example, simulated inputs 26 may be sent to the PLC 16 to cover a full range of inputs 26 that may be potentially be received by the PLC 16. The range of inputs 26 that need to be simulated may be determined based on template data for a device type of the PLC 16, which will be discussed in more detail below. In this example, the edge computing device 12 may detect the outputs 24 sent by the PLC 16 in response to the simulated inputs 26. In either example, the inputs 26, whether real or simulated, and outputs 24 are gathered and stored at the edge computing device 12.

As illustrated in FIG. 4, the processor 46 may be configured to perform several pre-processing functions at a pre-processing module 52. In one example, the pre-processing module 52 may be configured to identify a device type 54 of the PLC 16. The device type 54 of the PLC 16 may be determined via any suitable technique. For example, device type 54 may be manually entered by an operator during an initialization phase of the edge computing device 12. The device type 54 may indicate a manufacturer, a model, a serial number, a category of PLC, or another type of identifier that may be used to determine the functions and characteristics of the PLC 16. In another example, the device type 54 of the PLC 16 may be determined by the edge computing device 12 using rules encoded in program logic, based on characteristics of the inputs 26 and outputs 24 detected via the input electrodes 34. It should be appreciated that the edge computing device 12 may employ other techniques for determining the device type 54 not specifically described herein to determine the device type 54 of each PLC that is encountered during training.

The edge computing device 12 may be further configured to retrieve template data 56 for the device type 54 of the programmable logic controller 16. In one example, the template data 56 may be retrieved from the remote computing device 30. As illustrated in FIG. 4, the remote computing device includes a remote processor 58 that may include a client interface for a user to interact with the edge computing device 12. The remote computing device 30 may be configured to store a database of templates that includes template data 56 for different device types 54 of PLC 16. In another example, the database of templates may be stored on a separate server system that may be accessed by the remote computing device 30 to retrieve the template data 56. In these examples, to retrieve the template data 56, the edge computing device 12 may be configured to send the device type 54 determined for the PLC 16 to the remote computing device 30, and receive the associated template data 56 in a response from the remote computing device 30.

The template data 56 may include a classification profile 60 for input types and output types associated with the device type 54 of the programmable logic controller 16. The classification profile 60 may include a list of each input type and output type that are implemented by the device type 54 of the PLC 16.

The following table shows example names, functions, and voltage or current ranges for different input types and output types that may be included in the classification profile 60 for the PLC 16. It should be appreciated that the examples shown in the table are not exhaustive, and are merely exemplary of a few input types and output types that exist. The classification profile 60 may include similar data for any other suitable input type and output type that may be implemented by PLC 16.

| Name | Functions | Range |
|---|---|---|
| 3V3 | Supply output | 3.3 V |
| A_INA | Analog input | 0-5 V, 0-24 V |
| A_INB | Analog input | 0-5 V, 0-24 V |
| GND | Ground | |
| GND | Ground | |
| GND | Ground | |
| C4_TX | COM4 UART TX | |
| UIO_3 | Digital input | 0-24 V |
| | Digital output | 0-24 V |
| | Analog voltage input | 0-24 V |
| | Analog voltage output | 0-24 V |
| | Analog current input | 0-30 mA |
| | Analog current output | 0-30 mA |
| UIO_1 | Digital input | 0-24 V |
| | Digital output | 0-24 V |
| | Analog voltage input | 0-24 V |
| | Analog voltage output | 0-24 V |
| | Analog current input | 0-30 mA |
| | Analog current output | 0-30 mA |
| PWM_1 | PWM (open-drain) output | 0-24 V |
| | PWM input | 0-24 V |
| | Analog input | 0-5 V, 0-24 V |
| PWM_4 | PWM (open-drain) output | 0-24 V |
| | PWM input | 0-24 V |
| PWM_5 | PWM (open-drain) output | 0-24 V |
| | PWM input | 0-24 V |
| CAN2H | CanBus 2.0B | |
| CAN2L | CanBus 2.0B | |
| C1_TX | COM1 RS232/RS485 | |
| C1_RX | COM1 RS232/RS485 | |
| C2_TX/C1_CTS | COM2 RS232 TX | |
| C2_RX/C1_RTS | COM2 RS232 RX | |
| C6_RX | COM6 RS232 | |
| C4_RX | COM4 UART RX | |
| UIO_2 | Digital input | 0-24 V |
| | Digital output | 0-24 V |
| | Analog voltage input | 0-24 V |
| | Analog voltage output | 0-24 V |
| | Analog current input | 0-30 mA |
| | Analog current output | 0-30 mA |
| PWM_0 | PWM (open-drain) output | 0-24 V |
| | PWM input | 0-24 V |
| | Analog input | 0-5 V, 0-24 V |
| C3_TX | COM3 RS232 | |
| C3_RX | COM3 RS232 | |
| CAN1H | CanBus 2.0B | |
| CAN1L | CanBus 2.0B | |
| RJ45_6 | Ethernet | |
| RJ45_3 | Ethernet | |
| RJ45_2 | Ethernet | |
| RJ45_1 | Ethernet | |
| C6_TX | COM6 RS232 | |
| SCLK2 | SPI2 SCLK | 3.3 V |
| ST_TDO | Programming/debug | |
| UIO_0 | Digital input | 0-24 V |
| | Digital output | 0-24 V |
| | Analog voltage input | 0-24 V |
| | Analog voltage output | 0-24 V |
| | Analog current input | 0-30 mA |
| | Analog current output | 0-30 mA |
| PWM_3 | PWM (open-drain) output | 0-24 V |
| | PWM input | 0-24 V |
| I2S_SD | I2S serial data | |
| I2C1_C | I2C1 SCL | 3.3 V |
| I2C1_D | I2C1 SDA | 3.3 V |
| MOSI1 | SPI1 MOSI | 3.3 V |
| I2S_SCK | I2S clock | |
| I2S_WS | I2S word select | |
| SP2_SS | SPI2 chip select | 3.3 V |
| ST_TCK | Programming/debug | |
| MISO2 | SPI2 MISO | 3.3 V |
| USB_P | USB 2.0 | |
| USB_N | USB 2.0 | |
| PWM_2 | PWM (open-drain) output | 0-24 V |
| | PWM input | 0-24 V |
| | Analog input | 0-5 V, 0-24 V |
| UIO_4 | Digital input | 0-24 V |
| | Digital output | 0-24 V |
| | Analog voltage input | 0-24 V |
| | Analog voltage output | 0-24 V |
| | Analog current input | 0-30 mA |
| | Analog current output | 0-30 mA |
| RST_N | Programming/debug | |
| I2C2_C | I2C2 SCL | 3.3 V |
| MISO1 | SPI1 MISO | 3.3 V |
| SCLK1 | SPI1 SCLK | 3.3 V |
| I2C2_D | I2C2 SDA | 3.3 V |
| MOSI2 | SPI2 MOSI | 3.3 V |
| DC_IN | Supply input | 7-50 V |
| ST_TMS | Programming/debug | |
| SP1_SS | SPI1 chip select | 3.3 V |
| 24VB | Supply output | 0-24 V |
| 5VO | Supply output | 5 V |
| 24VA | Supply output | 0-24 V |

The pre-processing module 52 may be configured to use the classification profile 60 of the template data 56 to classify the signals detected on the communication channels 20 of the PLC 16 into known input types and output types. To perform this classification process, the pre-processing module 52 may be configured to determine one or more electronic characteristics of each communication channel 20 of the PLC 16. The electronic characteristics may include parameters such as a voltage, current, impedance, capacitance, frequency, etc. of signals transmitted on that communication channel 20. As another example, the electronic characteristics may include a number of pins or ports used for that communication channel 20. As another example, the electronic characteristics may include a signal type for signals transmitted on that communication channels 20, such as analog or digital. It should be appreciated that the edge computing device 12 may be configured to detect other types of electronic characteristics that are not limited to the specific examples described herein.

The edge computing device 12, at the pre-processing, may be further configured to classify each communication channels 20 of the PLC 16 to an input type or an output type based on the determined one or more electronic characteristics of each communication channel 20 and the classification profile 60 of the retrieved template data 56 for the device type 54 of the PLC 16. The classification profile 60 may include all of the input types and output types that are known for the particular model of PLC 16. The classification profile 60 may include descriptions of electronic characteristics for each of those input types and output types. The edge computing device 12 may be configured to compare the detected electronic characteristics of the communication channels 20 to the described electronic characteristics in the classification profile 60 in order to identify and classify each communication channel. For example, based on the detected electronic characteristics, the edge computing device may classify a communication channel to an output type for a drive signal that is sent to an actuator of a robot arm controlled device. As another example, based on the detected electronic characteristics, the edge computing device may classify another communication channel to an analog input type, or another input type listed in the table shown above.

In another example, a human operator may manually perform the classification of the communication channels 20 by entering input to an interface on the remote computing device 30. In either of these examples, after classifying each of the communication channels 20, the pre-processing module 52 may then be configured to classify each inputs 26 and output 24 received via the input electrodes 34 based on the communication channels 20 that the inputs and outputs were received on. The resulting classified input and output data 62 may be stored on the edge computing device 12.

The pre-processing module 52 may be further configured to determine an operation range 64 for each of the classified input types based at least on the classification profile 60 for that input type. For example, the classification profile 60 may indicate electronic characteristics of the input types associated with the PLC 16 including an expected operation range 64. The table of example input and outputs types shown above shows various example operation ranges 64 that would be expected for each input and output type. The pre-processing module 52 may be configured to store respective operation ranges 64 for each of the classified inputs and outputs 62.

During normal operation, due to degradation or other factors, the actual operation range of the devices may potentially change over time. That is, a sensor that is expected to output a signal at 4V may instead, over time, output a signal at 4.2V. However, even though the operation range of that sensor has deviated slightly from the expected operation range, the sensor may nonetheless be operating normally. The pre-processing module 52 may be configured to detect these changes in operation range over time, and update the operation range 64 stored for that input to the new value. The operating ranges 64 may be stored and used for error correction processes during run-time, as will be discussed in more detail below.

The device type 54 of the PLC 16 determined by the pre-preprocessing module 52 may also be used in an initialization step for the AI model 50. In one example, the AI model 50 may take the form of a Deep Neural Network (DNN). In a neural network, the depth and width of the neural network's layers, and the characteristics of the connections between each of the neural network's layers may define a topology of that neural network. Different topologies for the neural network may be more optimized for respective different machine learning scenarios.

The remote computing device 30 may be configured to store a database of AI models 50 with different predetermined topologies 66. Each of the AI models 50 may be associated with respective device types 54 of PLCs 16. That is, different types of PLCs 16 may be associated with respective AI models 50 with predetermined topologies 66 that are optimized for that particular type of PLC 16. The edge computing device 12 may be configured to send the device type 54 of the PLC 16, and receive an AI model 50 having a predetermining topology 66 that is selected based on the device type 54 of the PLC 16.

Figure 5:
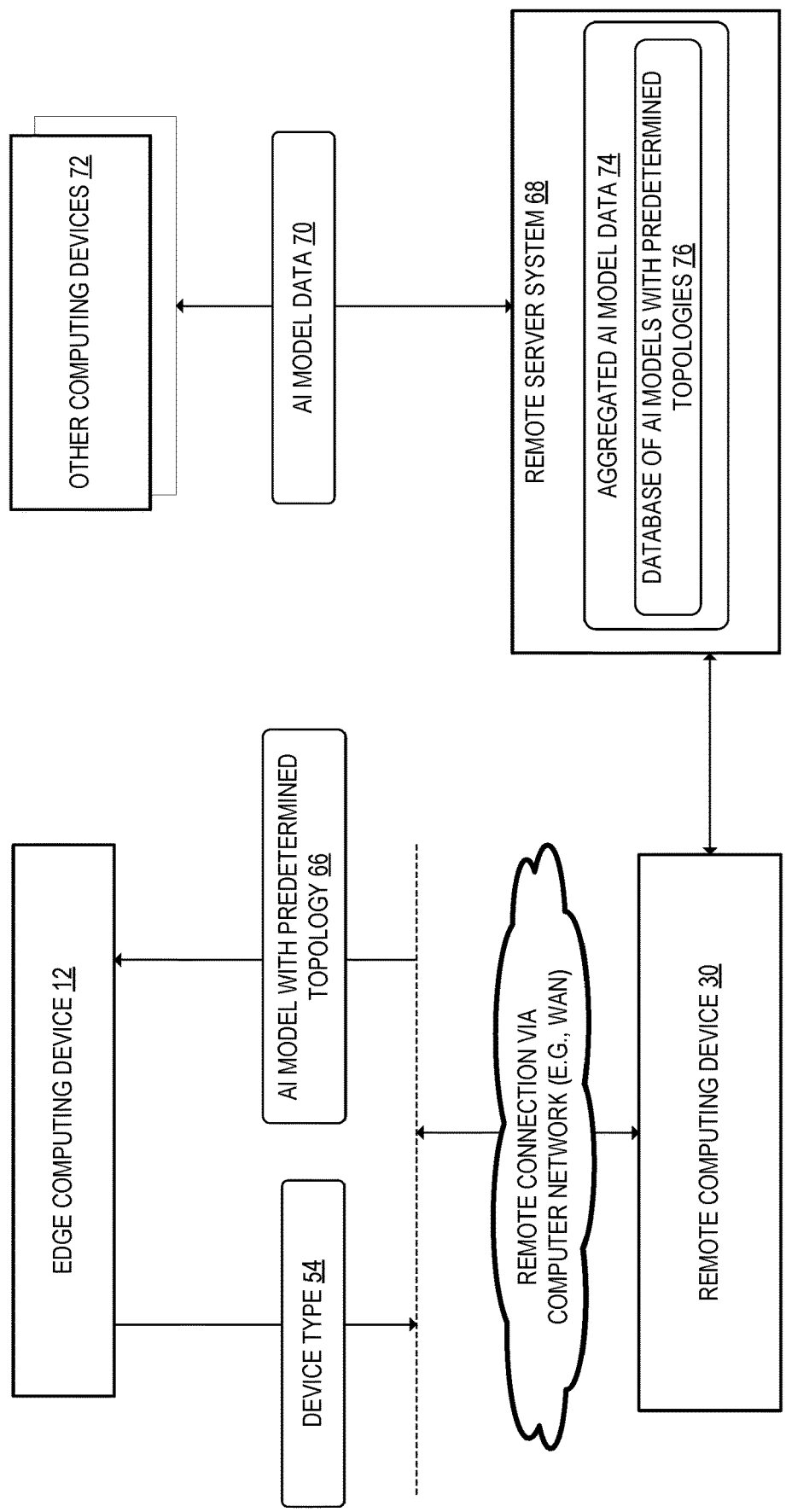
FIG. 5 is a schematic diagram illustrating a computer system for aggregating artificial intelligence model data from a plurality of computer devices including the edge computing device of FIG. 1.

Turning briefly to FIG. 5, the remote computing device 30 may be a client computer device that provides an interface for a user to interact with the edge computing device 12. In this example, the remote computing device 30 itself may not necessarily store the database of AI models having different topologies for different device types of PLCs. Rather, a remote server system 58 may be configured to aggregate AI model data 70 from the edge computing device 12 through the remote computing device 30, as well as other edge computing devices owned by other entities through respective other computing devices 72. In one example, the aggregated AI model data 74 may include a database of AI models with predetermined topologies 76. Thus, when the edge computing device 12 sends the device type 54 to the remote computing device 30, the remote computing device 30 may subsequently send that device type 54 to the remote server system 68. The remote server system 68 may be configured to determine whether the aggregated AI model data 74 includes an AI model with a predetermined topology that is optimized or otherwise targeted to that particular device type 54 of the PLC 16. If an AI model with a predetermined topology 66 does exist for the device type 54, the remote server system 68 may send that AI model to the remote computing device 30, which may in turn send that AI model to the edge computing device 12. In this manner, the AI model data 70 generated by many different entities may be collaboratively shared via the remote server system 68.

Turning back to FIG. 4, after initializing the AI model 50 as discussed above, the edge computing device 12 may move to a training phase for the AI model 50. A training module 78 of the edge computing device 12 may be configured to receive the classified inputs and outputs 62, and generate a set of training data 80 based on the classified inputs and outputs 62 of the PLC 16 detected via the input electrodes 34. The training module 78 may then be configured to train the AI model 50 using the generated set of training data 80. As a result of the training, which will be discussed in more detail below, the AI model 50 will be trained for emulated control logic 82 such that outputs from the AI model 50 during run-time will match the outputs 24 generated by the PLC 16. In this manner, the trained AI model may be used to replace the PLC 16 and control the controlled device 14.

Figure 6:
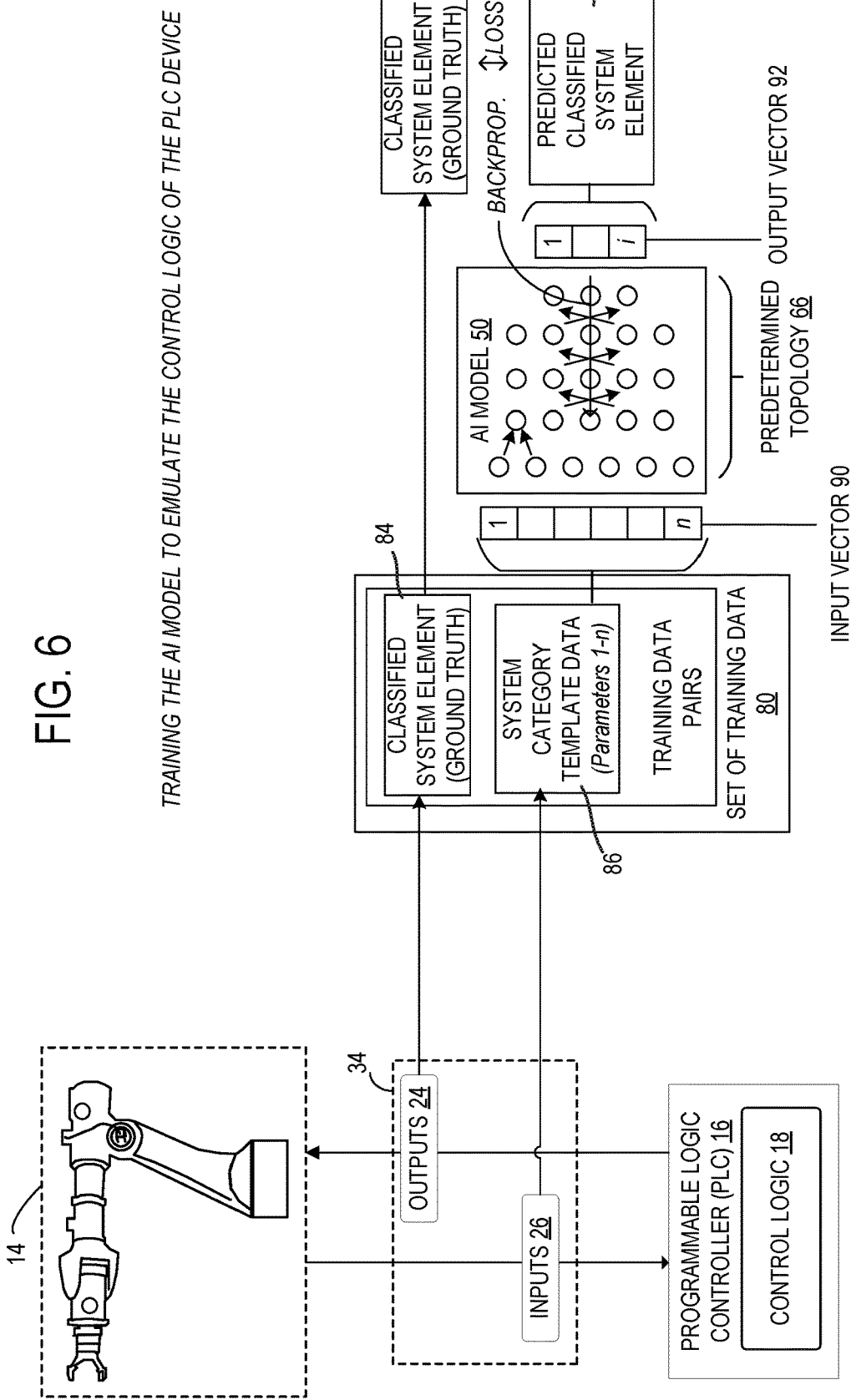
FIG. 6 is a detailed schematic diagram illustrating a set of training data that is used to train an artificial intelligence model for the edge computing device of FIG. 1.

FIG. 6 illustrates an example technique for training the AI model 50. As discussed above, the set of training data 80 is generated based on the classified inputs and outputs 62, and used to train the AI model 50. For each vector (i.e., ordered set) of classified inputs 26, the set of training data 80 includes a classified system element 84, designated as ground truth, which is a classified output 24 that was generated by the PLC 16 in response to receiving that vector of classified inputs 26. In this way, classified outputs 24 are stored as ground truth classifications for system elements and are paired with classified inputs 26 that are stored as system category template data 86 in the set of training data 80. The system category template data 86 containing the classified inputs 26 is fed as input into the AI model 50, the ground truth classified system elements 84 are fed as outputs into the AI model 50, and the AI model 50 is trained to minimize the error or loss between the predicted classified system element 88 from the AI model 50 and ground truth classified system element 84 through adjusting the weights between nodes in each layer of the AI model 50 via a backpropagation algorithm. In one example, on the input side, the set of training data 80 is decomposed into multiple convolutional layers in a convolutional system classification neural network to train the convolutional system classification neural network. By training the AI model 50 with a large number of training data pairs of the set of training data 80 at training time, the AI model 50 can be successfully trained to classify such system category template data 86 into predicted classified system elements 88 at run time, with greater accuracy.

Each training data pair of the set of training data 80 includes an input vector 90 and an output vector 92. The edge computing device 12 may be configured to determine a composition of the input vector 90 for the set of training data 80 based on the classified input types of the detected inputs 26 to the PLC. For example, the input vector 90 size (1-n) may be determined based on the total number of classified input types associated with the PLC 16. Additionally, some classified input types may be composed of a plurality of concurrent signals, which may affect the composition of the input vector 90. Similarly, the edge computing device 12 may be configured to determine a composition of the output vector 92 for the set of training data 80 based on the classified output types of the detected outputs 24 from the PLC 16.

As different classified input types may have different operation ranges 64, the edge computing device 12 may be configured to normalize or scale values for each of the detected inputs 26 based on respective classified input types. For example, if the classified input type of a first input has an operation range of (0-4V), then the edge computing device may be configured to normalize a detected value of 2V to a value of 0.5 for a normalized range of (0-1) for that classified input type. In this manner, each input in the input vector 90 may be normalized or scaled to a normalized range of (0-1) before being fed to the AI model 50. Similarly, the edge computing device 12 may also normalize or scale values for each of the detected outputs 26 based on respective classified output types.

Figure 7:
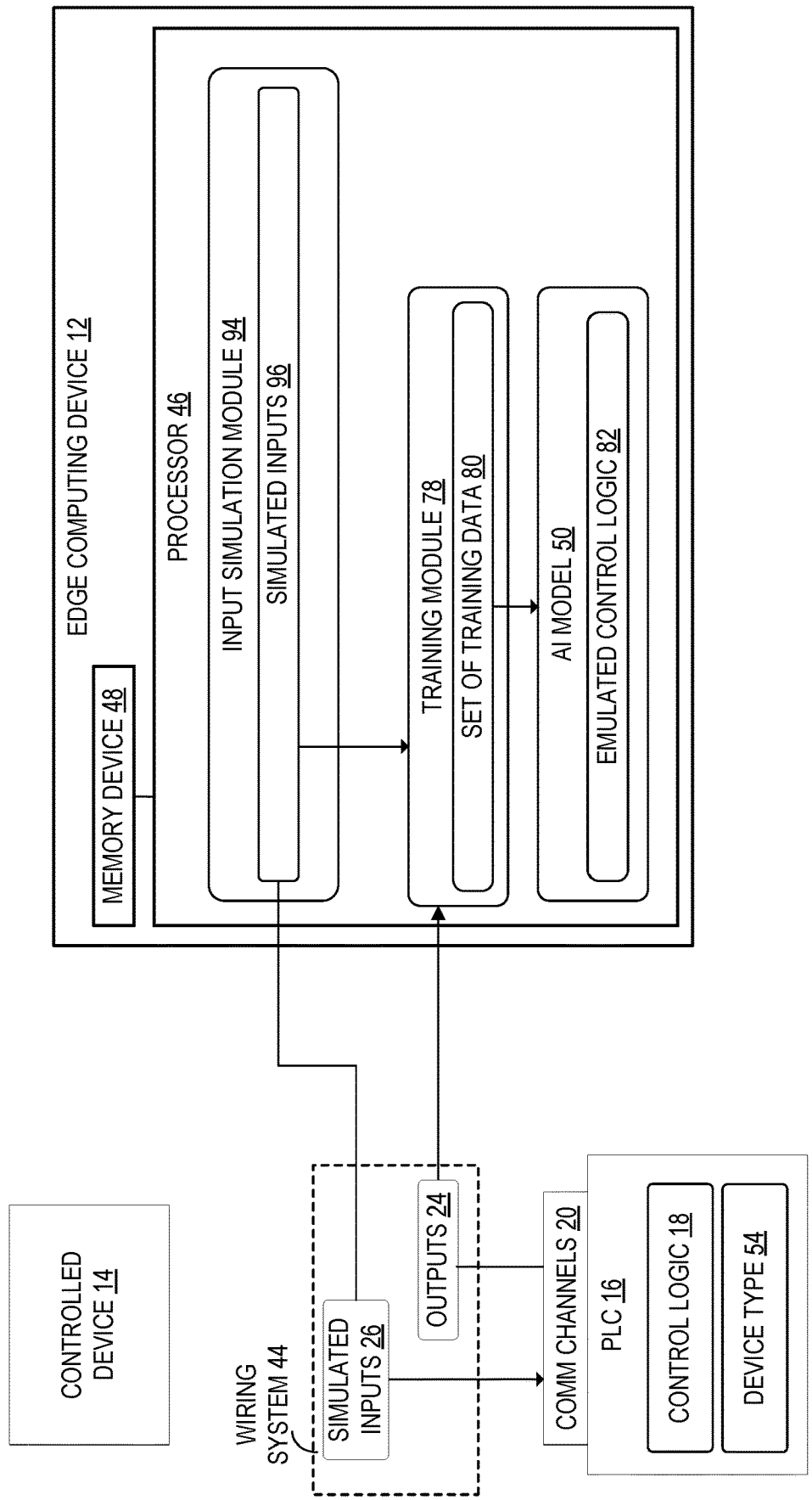
FIG. 7 is a schematic diagram illustrating a training process that generates simulated input for training an artificial intelligence model for the edge computing device of FIG. 1.

FIG. 7 illustrates another AI model training technique. In this example, rather than passively detecting inputs and outputs exchanged between the PLC 16 and the controlled device 14 during normal operation, the edge computing device is instead configured to send simulated inputs to the PLC 16, and receive the outputs 24 from the PLC 16 generated using the control logic 18 in response to the simulated inputs. The edge computing device 12 may include a wiring system 44 that is coupled to one or more communication channels 20 of the PLC. Using the techniques described above, the edge computing device 12 may determine a device type 54 of the PLC 16, and identify all of the classified input types associated with that device type 54. An input simulation module 92 executed by the processor 46 of the edge computing device 12 may be configured to determine a set of simulated inputs 96 that covers a range of combinations and variations of the classified input types associated with the device type 54 of the PLC 16. In this manner, the input simulation module 94 may generated simulated input 96 to cover all potential inputs that the PLC 16 would receive from the controlled device 14 during operation.

The edge computing device 12 may be configured to send the simulated inputs 96 to the PLC 16 via the wiring system 44. From the perspective of the PLC 16, the inputs are real inputs coming form the controlled device 14. Thus, the PLC 16 processes the simulated inputs 26 using control logic 18, and generates outputs 24 that are sent via the communication channels 20. The edge computing device 12 receives the outputs 24 via the wiring system 44, and sends the outputs 24 to the training module 78. Using the techniques described above, the training module 78 may be configured to generate the set of training data 80 based on the simulated set of inputs 96 and the detected outputs 24 from the PLC 16. The AI model 50 may then be trained using the set of training data 80. It should be appreciated that the edge computing device 12 may also perform the pre-processing steps described above.

Figure 8:
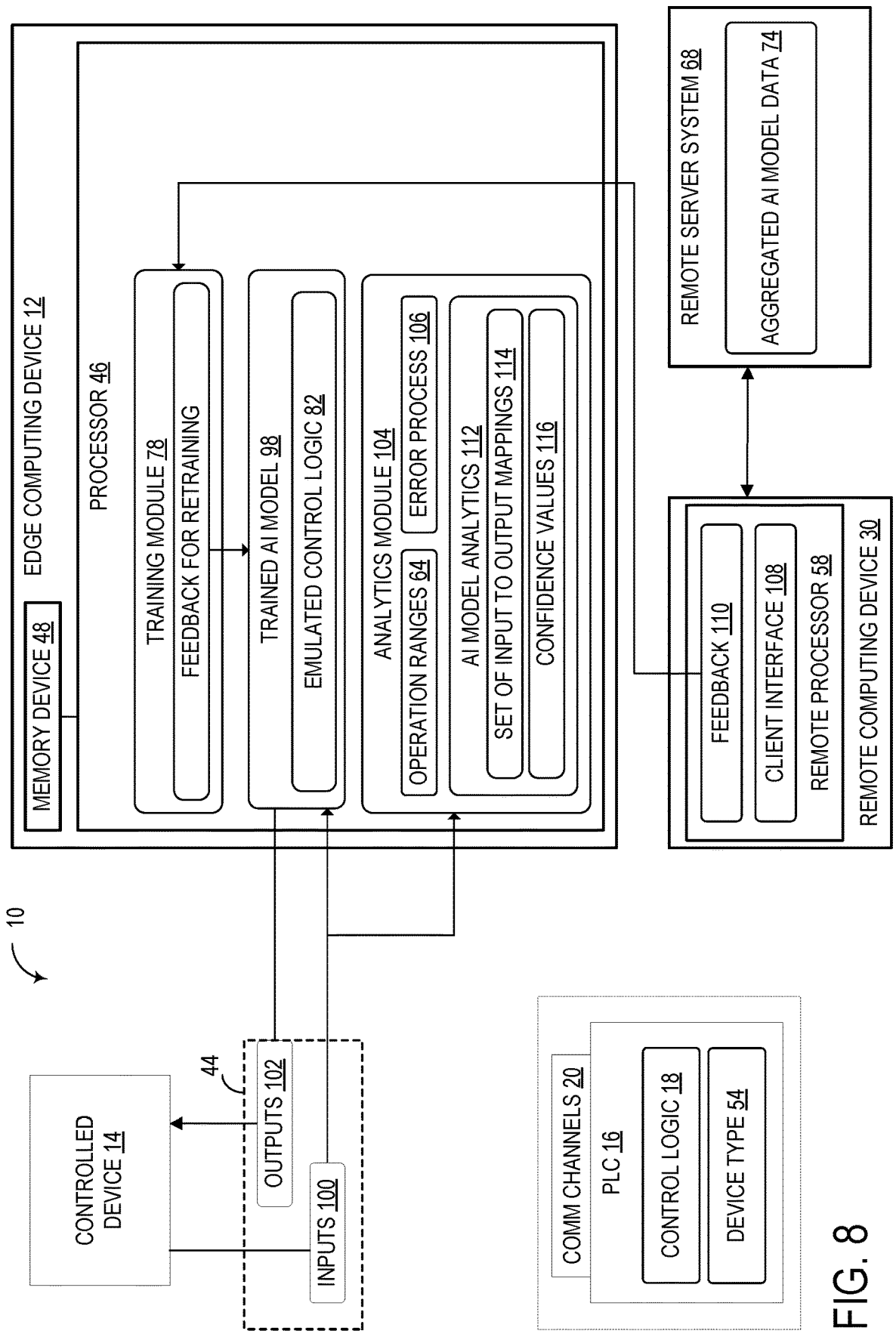
FIG. 8 is a detailed schematic diagram illustrating running a trained artificial intelligence model to emulate control logic of a programmable logic controller for the edge computing device of FIG. 1.

FIG. 8 illustrates the example computer system 10 at run time after the AI model 50 has been trained. The edge computing device 12 may be configured to emulate the control logic 18 of the PLC 16 using the trained artificial intelligence model 98. The controlled device 14 may be decoupled from the PLC 16, and communicatively coupled to the edge computing device 12 via the wiring system 44. Inputs 100 from the controlled device 14 may be sent to the edge computing device 12 via the wiring system 44.

The edge computing device 12 receives the input 100 from the controlled device 14, and processes the input 100 using the trained AI model 98. The edge computing device 12 determines an output 102 based on the inputs 100 using the emulated control logic 82 of the trained AI model 98. The trained AI model 98 will produce the same output 102 that the control logic 18 of the PLC 16 would have produced given the same inputs 100. The output 102 is sent to the controlled device 14 via the wiring system 44. Using the techniques described herein, the controlled device 14 may be controlled by the edge computing device 12 in the same manner as the PLC 16. Thus, after training the AI model, the edge computing device 12 may be used to replace the PLC 16.

In the example illustrated in FIG. 8, the processor 46 of the edge computing device 12 may be further configured to implement an analytics module 104. The analytics module 104 may be configured to monitor the received inputs 100 from the controlled device 14. That is, inputs 100 generated by the controlled device 14 may be sent to both the trained AI model 98 and the analytics module 104. The analytics module 104 may compare the inputs 100 to the operating ranges 64 determined for the input types of those inputs 100. If the analytics module 104 determines that at least one of the received inputs 100 from the controlled device 14 has a value that is outside of the operation range 64 for that input, then the analytics module 104 may trigger an error process 106. In one example, the error process 106 may include generating a log for the at least one input 100 and the result of the trained AI model 98 from processing the at least one input 100. The log may then be sent to the remote computing device 30 and presented to a user of the edge computing device 12.

In another example, the error process 106 may include an error correction process. Upon determining that at least one received input 100 has a value that is outside of the operation range 64 for that input, the analytics module 104 may be configured to send the at least one of the received inputs 100 to a remote computing device 30. In one example, the remote computing device 30 may be configured to present a client interface 108 that may be used by a user. The at least one input 100 may be presented to the user via the client interface 108. Using the client interface 108, the user may enter feedback 110 for the trained AI model 98. The feedback 110 may, for example, include an indication that the operation range 64 for that input should be expanded to include the value of the received input 100 that triggered the error process 106. In another example, the feedback 110 may include an indicate that the output 102 produced by the trained AI model 98 in response to the at least one input that triggered the error process 106 was correct or incorrect, which may be used to retrain the trained AI model 98. In another example, the feedback 110 may include an output 102 that the trained AI model 98 should generate in response to the at least one input 100. It should be appreciated that the feedback 110 is not limited to the specific examples described above.

In another example, to generate the feedback 110 for the trained AI model 98, the remote computing device 30 may be configured to send the input 100 that triggered the error process 106 to the remote server system 68. The remote server system 68 may be configured to analyze the input 100 using the aggregated AI model data 74, and determine how other AI models of other edge computing devices have handled a similar input. The remote server system 68 may then determine the feedback 110, and sent the feedback 110 to the remote computing device 30. The edge computing device 12 may be configured to receive the feedback 110 for the trained artificial intelligence model 98, and retrain the trained artificial intelligence model 98 using the received feedback 110.

In one example, the analytics module 104 may be further configured to analyze the trained AI model 98 and produce AI model analytics 112 that may be presented to a user via the client interface 108 on the remote computing device 30. The AI model analytics 112 may include human consumable data that helps a user understand the trained AI model 98. In one example, the analytics module 104 may be configured to determine a set of input to output mappings 114. The analytics module may be configured to map each permutation of values for the output vector 92 from the trained AI model 98 to the values of the input vector 90 that would cause that particular output. Each of those input to output mappings 114 may be stored in the AI model analytics 112. That analytics module 104 may be further configured to determine a confidence value 116 for each of those mappings based on the weightings of the trained AI model 98. The analytics module 104 may be configured to send the AI model analytics 112 to the remote computing device 30 to cause the remoting computing device to display the AI model analytics 112 via a graphical user interface (GUI) in the client interface 108. The remote computing device 30 may present, via the GUI, the determined set of input to output mappings 114 and a visualization of the confidence value 116 for each input to output mapping.

Figure 9:
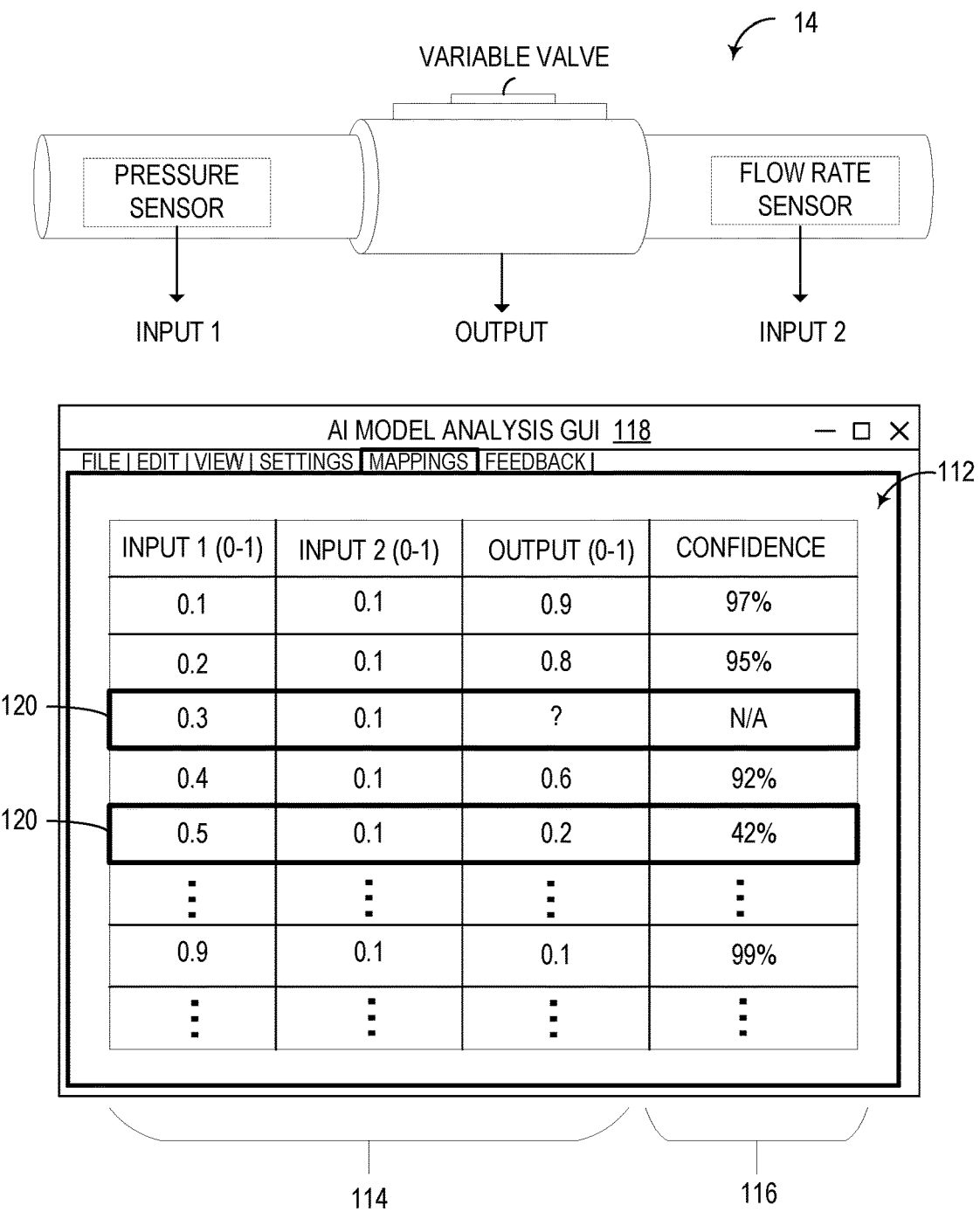
FIG. 9 is a schematic diagram illustrating an example artificial intelligence model analysis graphical user interface used to enter feedback for a trained artificial intelligence model run by the edge computing device of FIG. 1.

FIG. 9 illustrates an example of an AI model analysis GUI 118 that is presenting example AI model analytics 112. In this example, the controlled device 14 is a variable flow rate system that may, for example, be used in a sewage treatment plant. The controlled device 14 includes two sensors, a pressure sensor and a flow rate sensor, that are located on either side of a variable valve. The PLC 16 controls the variable valve of the controlled device 14 based on the readings from the pressure sensor and the flow rate sensor in order to achieve a target flow rate for liquids traveling through the controlled device 14. The trained AI model 98 of the edge computing device 12 was trained to emulate the control logic 18 of the PLC 16, and is used to control the controlled device 14 in place of the PLC 16. The analytics module 104 has analyzed the trained AI model 98, and generated AI model analytics 112 that are presented via the AI model analysis GUI 118 presented on the remote computing device 30.

As shown, the AI model analysis GUI 118 may present all of the input to output mappings 114 of the trained AI model 98. That is, each permutation of inputs in the input vector 90 (e.g. variations of input 1+input 2) are shown with respective outputs that used to control the variable valve of the controlled device 14. The AI model analysis GUI 118 also shows a confidence value for each of those input to output mappings. Using the AI model analysis GUI 118, a user of the remote computing device 30 may check whether the input to output mappings learned by the trained AI model 98 are correct.

In one example, the AI model analysis GUI 118 may also provide indications of potentially missing input to output mappings or low confidence mappings of the trained AI model 98. In the example of FIG. 9, the AI model analysis GUI 118 has highlighted two entries in the mapping table to bring the user's attention to two potential errors or inefficiencies in the trained AI model 98. In the first entry 120, the AI model analysis GUI 118 indicates that a potential permutation of inputs does not have a corresponding output. This error might have occurred due to an oversight in the original control logic 18 of the PLC 16, or due to that particular permutation of inputs not occurring during the training time of the AI model. In the second entry 122, the AI model analysis GUI 118 indicates that the input to output mapping has a confidence value below a threshold value, and may thus be incorrect. By directing the user's attention to these potential errors or inefficiencies in the input to output mappings 114, the AI model analysis GUI 118 may allow the user or operator of the edge computing device 12 to quickly understand where those errors have occurred and enter specific feedback to address those errors.

The operator may then enter feedback 110 to the remote computing device 30 to address any error or inefficiency in the input to output mappings 114. The AI model analysis GUI 118 of FIG. 9 includes a feedback window that may facilitate the operator in entering the feedback 110. The edge computing device 12 may be configured to receive the operator feedback 110 from for a target input to output mapping. The edge computing device 12 may then retrain the trained AI model 98 based on the received operator feedback 110. In this manner, errors and inefficiencies in the trained AI model 98 may be fixed, and control over the controlled device 14 may be improved. It should be appreciated that these errors and inefficiencies may have occurred due to errors in the original control logic 18 of the PLC 16.

Thus, the analytic techniques available to the edge computing device 12 that are typically not available for PLCs 16 may be used to improve the performance of the controlled device 14.

Figure 10:
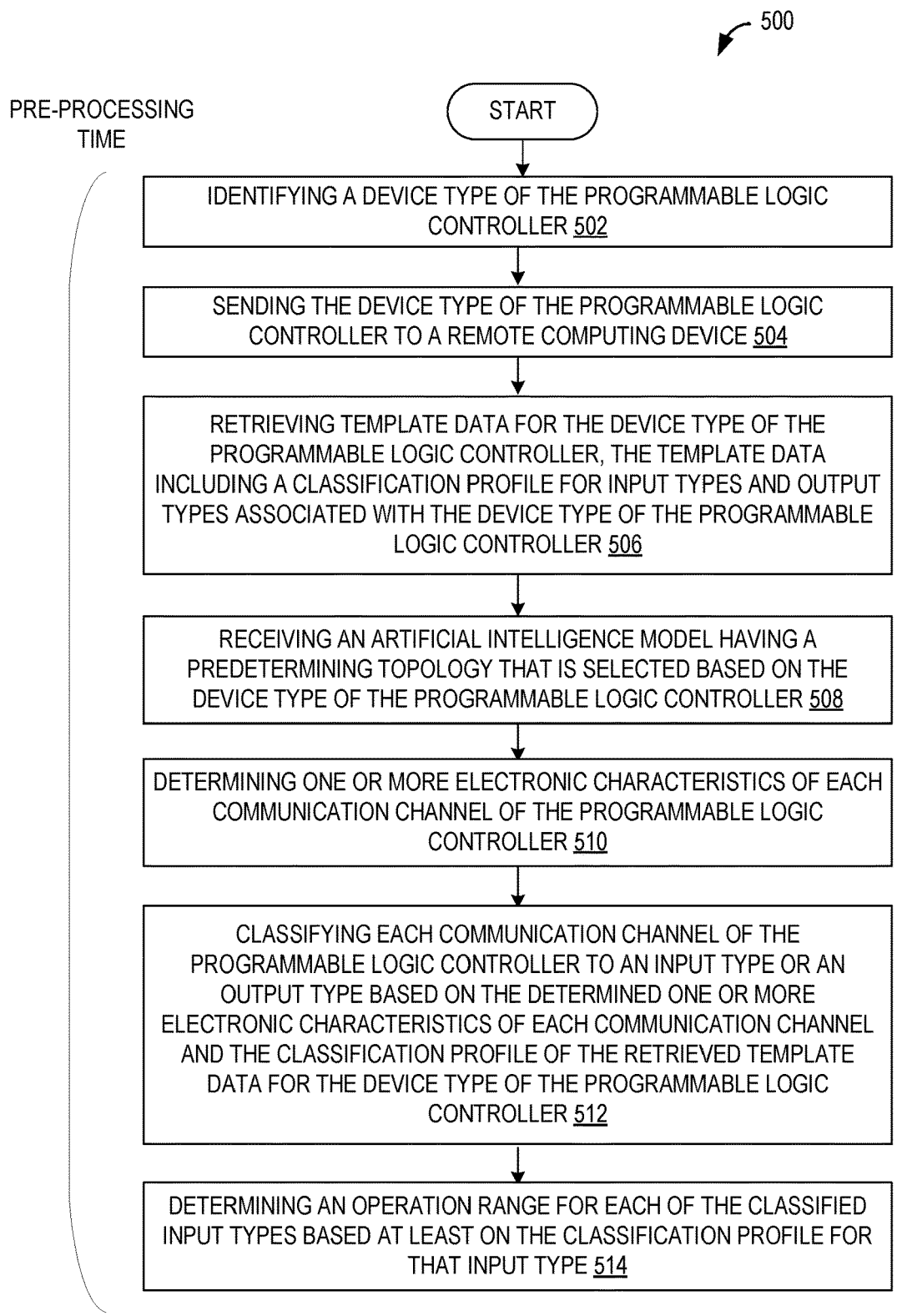
FIG. 10 is a flowchart of a method for training an artificial intelligence model to emulate the control logic of a programmable logic controller according to an embodiment of the subject disclosure.

FIG. 10 illustrates a flow chart for an example method 500 for training an AI model to emulate the control logic of a PLC, according to one example implementation. The following description of method 500 is provided with reference to the software and hardware components described above and shown in FIGS. 1 through 4. It will be appreciated that method 500 also can be performed in other contexts using other suitable hardware and software components.

Steps 502 through 514 of method 500 occur during a pre-processing time. At step 502, the method 500 may include identifying a device type of the programmable logic controller. At 504, the method 500 may include sending the device type of the programmable logic controller to a remote computing device. At 506, the method 500 may include retrieving template data for the device type of the programmable logic controller. The template data includes a classification profile for input types and output types associated with the device type of the programmable logic controller. In addition to retrieving the template data for the device type of programmable logic controller, at 508, the method 500 may include receiving an artificial intelligence model having a predetermining topology that is selected based on the device type of the programmable logic controller.

At 510, the method 500 may include determining one or more electronic characteristics of each communication channel of the programmable logic controller. The electronic characteristics may include parameters such as a Voltage of signals transmitted on that communication channel. As another example, the electronic characteristics may include a number of pins or ports used for that communication channel. As another example, the electronic characteristics may include a signal type for signals transmitted on that communication channels, such as analog or digital.

At 512, the method 500 may include classifying each communication channel of the programmable logic controller to an input type or an output type based on the determined one or more electronic characteristics of each communication channel and the classification profile of the retrieved template data for the device type of the programmable logic controller. Example input types and output types are shown above in a table format. At 514, the method 500 may include determining an operation range for each of the classified input types based at least on the classification profile for that input type. Example operation ranges are also shown above in the table.

Figure 11:
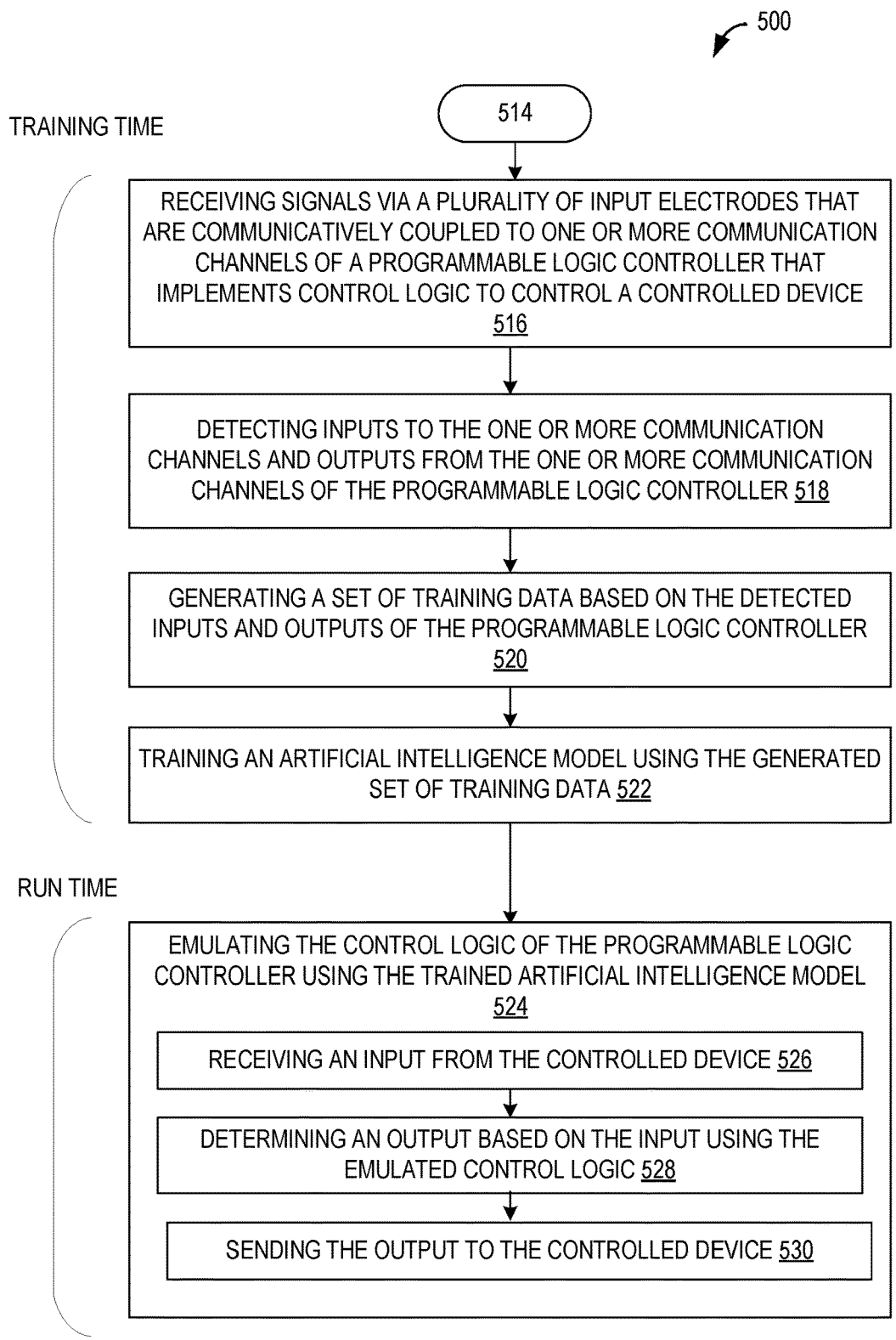
FIG. 11 continues the flowchart of FIG. 10.

FIG. 11 continues the flowchart of method 500. Steps 516 through 522 occur at a training time for an AI model. At 516, the method 500 may include receiving signals via a plurality of input electrodes that are communicatively coupled to one or more communication channels of a programmable logic controller that implements control logic to control a controlled device. At 518, the method 500 may include detecting inputs to the one or more communication channels and outputs from the one or more communication channels of the programmable logic controller.

At 520, the method 500 may include generating a set of training data based on the detected inputs and outputs of the programmable logic controller. The set of training data may include both an input vector and an output vector for the AI model. A composition of the input vector for the set of training data may be determined based on the classified input types of the detected inputs to the programmable logic controller. Additionally, values for each of the detected inputs may be normalized or scaled based on respective classified input types. A composition of an output vector for the set of training data may be determined based on the classified output types of the detected outputs from the programmable logic controller. Additionally, values for each of the detected outputs may be normalized or scaled based on respective classified output types.

At 522, the method 500 may include training an artificial intelligence model using the generated set of training data. An example process for training the artificial intelligence model is described above with reference to FIG. 6.

Steps 524 through 530 occur at a run time for the AI model. At 524, the method may include emulating the control logic of the programmable logic controller using the trained artificial intelligence model. Step 524 includes steps 526 through 530. At 526, the method 500 may include receiving an input from the controlled device. At 528, the method 500 may include determining an output based on the input using the emulated control logic. At 530, the method 500 may include sending the output to the controlled device.

Figure 12:
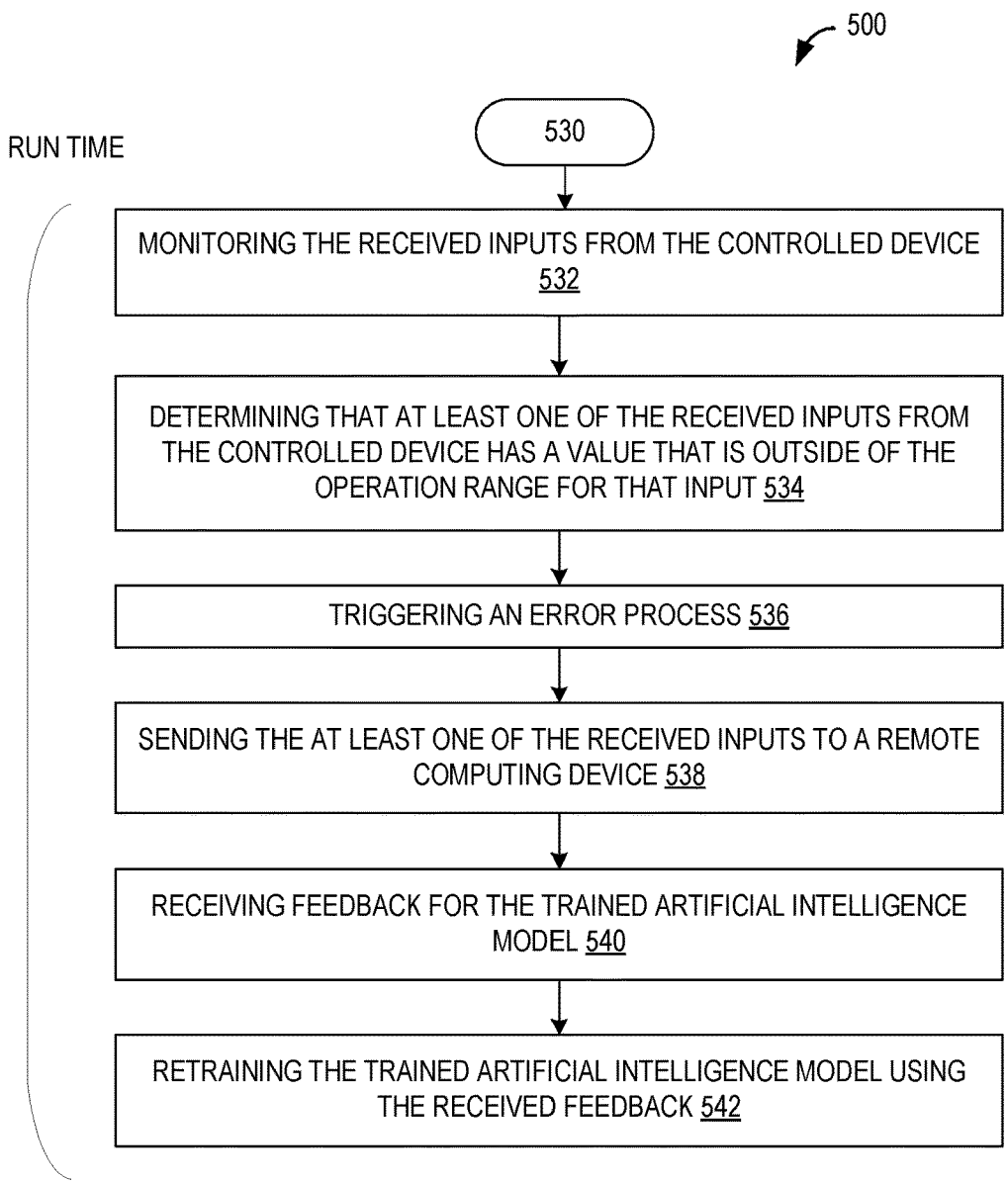
FIG. 12 continues the flowchart of FIG. 11.

FIG. 12 continues the flowchart of method 500. Steps 532 through 542 occur during the run time of the AI model. At 532, the method 500 may include monitoring the received inputs from the controlled device. At 534, the method 500 may include determining that at least one of the received inputs from the controlled device has a value that is outside of the operation range for that input. At 536, the method 500 may include triggering an error process. In one example, the error process may include an alert that is presented to a user or operator of the edge computing device. The alert may indicate that an error has occurred that requires the attention of the operator.

In another example, the error process may further include an error correction process. At 538, the method 500 may include sending the at least one of the received inputs to a remote computing device. At 540, the method 500 may include receiving feedback for the trained artificial intelligence model. At 542, the method 500 may include retraining the trained artificial intelligence model using the received feedback.

The systems and processes described herein have the potential benefit of increasing the ease of updating and maintaining the control system for a controlled device by replacing a PLC with an edge computing device running a trained AI model that emulates the control logic of the PLC. The edge computing device may also provide data analytic processes that have the potential benefit of identifying errors or inefficiencies in the original control logic of the PLC that may potentially be improved.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
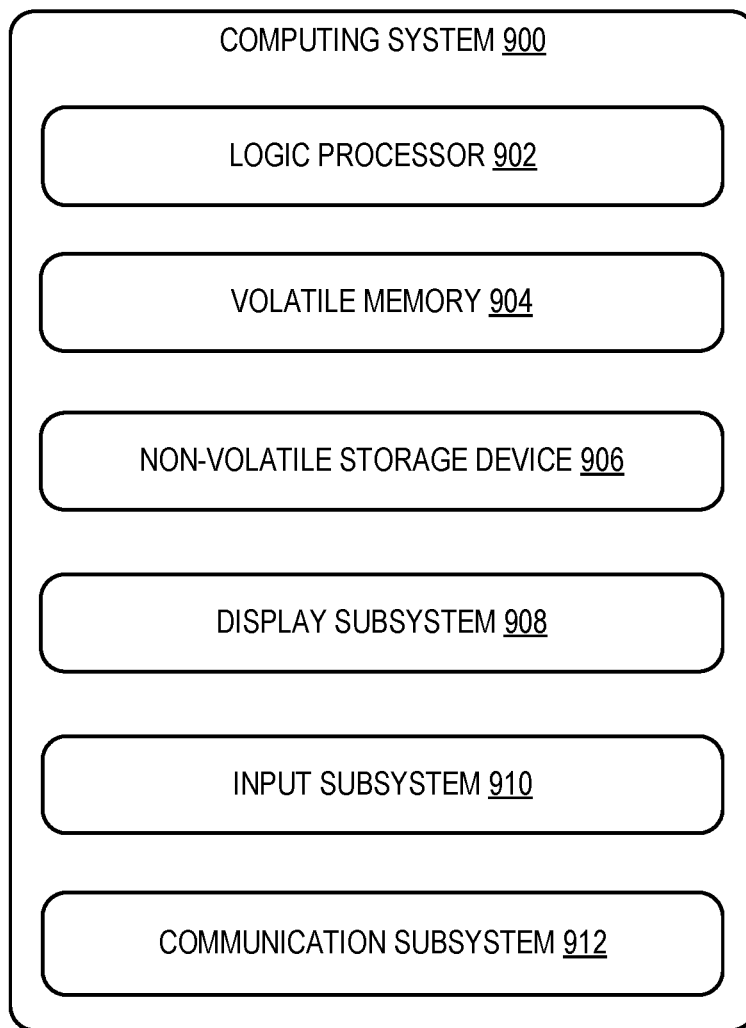
FIG. 13 is a schematic diagram illustrating an exemplary computing system that can be used to implement the edge computing device of FIG. 1.

FIG. 13 schematically shows a non-limiting embodiment of a computing system 900 that can enact one or more of the methods and processes described above. Computing system 900 is shown in simplified form. Computing system 900 may embody the edge computing device 12 described above and illustrated in FIG. 1. Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An edge computing device, comprising:
a plurality of input electrodes that are communicatively coupled to one or more communication channels of a programmable logic controller that implements control logic to control a controlled device, and
a processor configured to:
at a training time:
receive signals via the plurality of input electrodes;
detect inputs to the one or more communication channels and outputs from the one or more communication channels of the programmable logic controller;
generate a set of training data based on the detected inputs and outputs of the programmable logic controller, wherein the set of training data includes a plurality of training data pairs, and wherein each training data pair includes,
an input vector based at least on one or more of the detected inputs to the one or more communication channels of the programmable logic controller, and
an output vector based at least on one or more of the detected outputs from the one or more communication channels of the programmable logic controller; and
train an artificial intelligence model using the generated set of training data to emulate the control logic of the programmable logic controller and thereby generate a run-time output configured to actuate the controlled device responsive to a run-time input;
at a run-time, emulate the control logic of the programmable logic controller using the trained artificial intelligence model by:
receiving the run-time input;
inputting the run-time input into the trained artificial intelligence model to thereby generate a run-time output using the emulated control logic; and
using the run-time output to actuate the controlled device responsive to the run-time input while the programmable logic controller is decoupled from the controlled device.

2. The edge computing device of claim 1, wherein the control logic is implemented as ladder logic.

3. The edge computing device of claim 1, wherein the processor is further configured to:
at a pre-processing time:
identify a device type of the programmable logic controller; and
retrieve template data for the device type of the programmable logic controller, the template data including a classification profile for input types and output types associated with the device type of the programmable logic controller.

4. The edge computing device of claim 3, wherein the processor is further configured to:
send the device type of the programmable logic controller to a remote computing device; and
receive an artificial intelligence model having a predetermining topology that is selected based on the device type of the programmable logic controller.

5. The edge computing device of claim 3, wherein the processor is further configured to:
at a pre-processing time:
determine one or more electronic characteristics of each communication channels of the programmable logic controller; and
classify each communication channel of the programmable logic controller to an input type or an output type based on the determined one or more electronic characteristics of that communication channel and the classification profile of the retrieved template data for the device type of the programmable logic controller.

6. The edge computing device of claim 5, wherein the processor is further configured to:
at the pre-processing time:
determine an operation range for each of the classified input types based at least on the classification profile for each classified input type;
at the run-time:
monitor the received inputs;
determine that at least one of the received has a value that is outside of the operation range for the classified input type associated with the received input; and
trigger an error process.

7. The edge computing device of claim 6, wherein the error process includes:
sending the at least one of the received inputs to a remote computing device;
receiving feedback for the trained artificial intelligence model; and
retraining the trained artificial intelligence model using the received feedback.

8. The edge computing device of claim 5, wherein to generate the set of training data, the processor is further configured to:
determine a composition of the input vector for the set of training data based on the classified input types of the detected inputs to the programmable logic controller; and
determine a composition of the output vector for the set of training data based on the classified output types of the detected outputs from the programmable logic controller.

9. The edge computing device of claim 6, wherein the processor is further configured to normalize or scale values for each of the detected inputs based on respective classified input types, and normalize or scale values for each of the detected outputs based on respective classified output types.

10. The edge computing device of claim 1, wherein the processor is further configured to:
analyze the trained artificial intelligence model to determine a set of input to output mappings and a confidence value for each input to output mapping; and
present, via a graphical user interface, the determined set of input to output mappings and a visualization of the confidence value for each input to output mapping.

11. The edge computing device of claim 10, where the processor is further configured to:
receive operator feedback from a user for a target input to output mapping; and
retrain the trained artificial intelligence model based on the received operator feedback.

12. A method, comprising:
at a processor of an edge computing device:
at a training time:

receiving signals via a plurality of input electrodes that are communicatively coupled to one or more communication channels of a programmable logic controller that implements control logic to control a controlled device;

detecting inputs to the one or more communication channels and outputs from the one or more communication channels of the programmable logic controller;

generating a set of training data based on the detected inputs and outputs of the programmable logic controller, wherein the set of training data includes a plurality of training data pairs, and wherein each training data pair includes, an input vector based at least on one or more of the detected inputs to the one or more communication channels of the programmable logic controller, and an output vector based at least on one or more of the detected outputs from the one or more communication channels of the programmable logic controller; and training an artificial intelligence model using the generated set of training data to emulate the control logic of the programmable logic controller and thereby generate a runtime output configured to actuate the controlled device responsive to a run-time input;

decoupling the programmable logic controller from the controlled device;

at a run-time, emulating the control logic of the programmable logic controller using the trained artificial intelligence model by:

receiving the run-time input;

inputting the run-time input into the trained artificial intelligence model to thereby generate a run-time output based on the input using the emulated control logic; and using the run-time output to actuate the controlled device responsive to the run-time input while the programmable logic controller is decoupled from the controlled device.

13. The method of claim 12, further comprising:
at a pre-processing time:
identifying a device type of the programmable logic controller; and
retrieving template data for the device type of the programmable logic controller, the template data including a classification profile for input types and output types associated with the device type of the programmable logic controller.

14. The method of claim 13, further comprising:
sending the device type of the programmable logic controller to a remote computing device; and
receiving an artificial intelligence model having a predetermining topology that is selected based on the device type of the programmable logic controller.

15. The method of claim 13, further comprising:
at the pre-processing time:
determining one or more electronic characteristics of each communication channel of the programmable logic controller; and
classifying each communication channel of the programmable logic controller to an input type or an output type based on the determined one or more electronic characteristics of each communication channel and the classification profile of the retrieved template data for the device type of the programmable logic controller.

16. The method device of claim 15, further comprising:
at the pre-processing time:
determining an operation range for each of the classified input types based at least on the classification profile for each classified input type;
at the run-time:
monitoring the received inputs;
determining that at least one of the received inputs has a value that is outside of the operation range for the classified input type associated with the received input; and
triggering an error process.

17. The method of claim 16, wherein the error process includes:
sending the at least one of the received inputs to a remote computing device;
receiving feedback for the trained artificial intelligence model; and
retraining the trained artificial intelligence model using the received feedback.

18. The method of claim 15, wherein generating the set of training data further includes:
determining a composition of the input vector for the set of training data based on the classified input types of the detected inputs to the programmable logic controller; and
determining a composition of the output vector for the set of training data based on the classified output types of the detected outputs from the programmable logic controller.

19. The method of claim 18, further comprising normalizing or scaling values for each of the detected inputs based on respective classified input types, and normalizing or scaling values for each of the detected outputs based on respective classified output types.

20. An edge computing device, comprising:
a wiring system that is coupled to one or more communication channels of a programmable logic controller that implements control logic to control a controlled device, and
a processor configured to:
at a training time:
simulate a set of inputs for the programmable logic controller;
send the set of inputs to the programmable logic controller via the wiring system;
detect outputs from the one or more communication channels of the programmable logic controller;
generate a set of training data based on the simulated set of inputs and the detected outputs from the programmable logic controller, wherein the set of training data includes a plurality of training data pairs, and wherein each training data pair includes,
an input vector based at least on one or more of the simulated inputs for the programmable logic controller,
an output vector based at least on one or more of the detected outputs from the one or more communication channels of the programmable logic controller; and
train an artificial intelligence model using the generated set of training data to emulate the control logic of the programmable logic controller and thereby generate a run-time output configured to actuate the controlled device responsive to a run-time input;

at a run-time, emulate the control logic of the programmable logic controller using the trained artificial intelligence model by:

receiving the run-time input;

inputting the run-time input into the trained artificial intelligence model to thereby generate a run-time output using the emulated control logic; and using the run-time output to actuate the controlled device responsive to the run-time input while the programmable logic controller is decoupled from the controlled device.

* * * * *